(12) United States Patent
Weinreich et al.

(10) Patent No.: US 9,518,203 B2
(45) Date of Patent: Dec. 13, 2016

(54) COMPOUND FOR IMPROVED TRACTION

(71) Applicants: Wesley E. Weinreich, Seneca, IL (US);
Michael R. Applebee, Seneca, IL (US)

(72) Inventors: Wesley E. Weinreich, Seneca, IL (US);
Michael R. Applebee, Seneca, IL (US)

(73) Assignee: PI Extreme, Inc., Seneca, IL (US)

( * ) Notice: Subject to any disclaimer, the term of this patent is extended or adjusted under 35 U.S.C. 154(b) by 4 days.

(21) Appl. No.: 14/296,054

(22) Filed: Jun. 4, 2014

(65) Prior Publication Data
US 2015/0353794 A1    Dec. 10, 2015

(51) Int. Cl.
*C09K 3/14*     (2006.01)
*F16D 69/00*    (2006.01)
*A43B 13/22*    (2006.01)

(52) U.S. Cl.
CPC .............. *C09K 3/149* (2013.01); *A43B 13/22* (2013.01); *F16D 69/00* (2013.01); *Y10T 428/31826* (2015.04)

(58) Field of Classification Search
None
See application file for complete search history.

(56) References Cited

U.S. PATENT DOCUMENTS

| | | |
|---|---|---|
| 2,862,310 A | 12/1958 | Bodnaruk |
| 3,316,662 A | 5/1967 | Schmadeke |
| 4,922,047 A | 5/1990 | Chen et al. |
| 5,679,628 A | 10/1997 | Simpson et al. |
| 5,965,512 A * | 10/1999 | Smyth ..................... C11D 1/72 510/362 |
| 7,074,262 B2 * | 7/2006 | Huang ..................... C08J 3/02 106/287.11 |
| 2006/0011216 A1 | 1/2006 | Potashnick |
| 2009/0197786 A1 * | 8/2009 | Perry ..................... C11D 1/835 510/191 |
| 2011/0314706 A1 | 12/2011 | French et al. |
| 2013/0142893 A1 | 6/2013 | Bessette et al. |
| 2014/0135437 A1 | 5/2014 | Sandstrom et al. |

FOREIGN PATENT DOCUMENTS

| | | |
|---|---|---|
| WO | 9618717 A1 | 6/1996 |
| WO | 2013032468 A2 | 3/2013 |

OTHER PUBLICATIONS

International Search Authority, "Search Report and Written Opinion", International Application PCT/US15/33917 filed Jun. 3, 2015, mailed Aug. 26, 2015, 9 pages.
Schaeffer's MFG, "Specialized Lubricants", pp. 1-8, Preparation/Revision Date: Aug. 3, 2010.

* cited by examiner

*Primary Examiner* — Laura Powers
(74) *Attorney, Agent, or Firm* — McKee, Voorhees & Sease, PLC

(57) ABSTRACT

The invention provides novel compounds that are non-adhesive and used to coat rubber surfaces for improved traction. An embodiment of the invention provides non-adhesive coating compositions that improve the traction of rubber surfaces. Another embodiment of the invention provides rubber surfaces with improved traction. Still another embodiment of the invention provides methods of improving the traction of rubber surfaces. The non-adhesive coating compositions comprise a terpene and/or an essential oil, a staying agent, and a cleaning carrier.

20 Claims, No Drawings

US 9,518,203 B2

COMPOUND FOR IMPROVED TRACTION

FIELD OF THE INVENTION

The invention relates to novel compounds that are non-adhesive and used to coat rubber surfaces for improved traction and grip. In particular, the invention relates to compounds, preferably natural compounds, that provide improved traction on surfaces, including for example rubber. In an aspect of the invention, the compounds can be used on rubber soles of shoes, rubber grips, or rubber gloves to improve shoe traction and grip.

BACKGROUND OF THE INVENTION

For some time athletes, coaches, shoe designers, and physically active individuals have desired shoes with good grip and traction. In many outdoor sports (e.g., golf, baseball, soccer, and football) cleats are used to provide improved traction. Further in many athletic activities played on hard surfaces, such as courts, the athletes are often required to stop quickly, pivot, jump, and/or reverse direction. These movements rely on the shoe's traction. There are many other reasons why improved traction is desirable, including, safety for people walking on surfaces. Similarly, it has been desirable to provide better traction and friction on rubber surfaces in general, whether or not related to athletic shoe traction. For example, it is desirable to have increased traction and friction for gripping a rubber surface or walking on a rubber surface. Examples include rubber handle grips in the work context, rubber gloves for gripping, treads on flooring and steps, rubber soles on work boots or other non-athletic shoes, grips on athletic equipment, including, but not limited to exercise equipment, baseball bats, racquets, and clubs.

Inventions directed at improving traction have varied from external devices added to shoes (e.g., U.S. Pat. No. 2,862,310 ("Adjustable Shoe Traction Device")) to shoe sole designs (e.g., U.S. Pat. No. 3,316,662 ("Safety Traction Athletic Shoe Soles")). With respect to court-sports, e.g., basketball, indoor volleyball, racquetball, one problem that has been identified and associated with poor traction is the build-up of micro-debris that often accumulates on sport courts. Potashnick, (U.S. Publ. No. 2006/00112416) discusses this problem and offers a proposed solution for using an adhesive roller to remove the micro-debris from the sole of the shoes to address the reduction of traction caused by the micro-debris. This, however, only addresses the reduction in traction caused by the build-up of micro-debris and does not actually improve traction on the shoes. Other attempts at addressing the problems with shoe traction, particularly for indoor use, have included the addition of pressure sensitive adhesives with tacky resins. See, e.g., French et al. (U.S. Publ. No. 2011/0314706). However, testing has demonstrated that the adhesive technologies are problematic for a number of reasons. One problem is that many, if not all, adhesive technologies require harsh chemicals that remove the dyes and colors nearby surfaces, e.g., the side of shoes. Further, the adhesive coatings collect and build-up micro-debris and dirt, which actually reduces the traction. The adhesive coatings often mark the surfaces which the coated rubber surface is in contact with (e.g., streaks and marks are left on a basketball court). Additionally, the adhesive coatings require frequent reapplication to maintain good traction. Other problems exist and some are evaluated in the examples section of the present application.

Accordingly there is a need for a compound useful for improving traction of rubber surfaces. Furthermore, there is a need for a compound useful for improving the traction of rubber surfaces that is non-adhesive.

Accordingly, it is an objective of the claimed invention to develop non-adhesive coating compositions that improve the traction of a rubber surface.

A further object of the present invention is to provide rubber surfaces with improved traction.

A still further object of the invention is to provide methods of improving the traction of rubber surfaces.

BRIEF SUMMARY OF THE INVENTION

The present invention provides improved traction, in particular when it is applied to a rubber surface, including for example, rubber-soled shoes or rubber gloves. It is an advantage of the present invention that the compounds can be easily applied to a rubber surface and provide improved traction. It is unexpected, according to the invention, that the ingredients in the formulation are able to form stable microemulsions, particularly, as the terpene component typically does not mix well with other components. Further, the percentage of traction improvement and duration for which it maintains were surprising.

In an embodiment, the present invention provides non-adhesive coating compositions that improve the traction of rubber surfaces.

In an embodiment, the present invention provides rubber surfaces with improved traction.

In another embodiment, the present invention provides methods of improving the traction of rubber surfaces.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION OF THE INVENTION

The present invention relates to compounds that provide improved traction. The compounds of the claimed invention have many advantages over existing technologies used for correcting and/or improving traction including for example, significantly improving traction and the duration for which the coating improves traction, do not attract dirt and micro-debris, and do not require frequent reapplication. For example, the compositions are made using non-harsh chemicals and non-adhesive formulations. The non-adhesive coating compositions allow users to have significantly increased traction. In the athletics context it allows users to compete at a much more intense and higher level of competition. This increased traction also greatly increases safety due to the lack of slippage at any competitive or recreational sports level or in the workplace.

The non-adhesive coating compositions not only improve traction but also clean and condition the rubber surface to which they are applied. In an embodiment, the non-adhesive coating compositions do not contain any type of adhesives and repel debris and dirt due to the chemical film composition. This is distinct from the adhesive type technologies which attract micro-debris and dirt. No negative effects were found. In particular, the non-adhesive coating compositions do not negatively affect rubber, leather or clothing when used as recommended. Further they were not found to negatively affect the floor upon which treated rubber surfaces (e.g., shoe soles) were operated on.

The present invention is particularly useful for sports and work conditions requiring traction, including both traction of shoes and grip with handheld applications. The invention increases friction and thereby safety.

The embodiments of this invention are not limited to particular compositions and methods of making, using and/or applying the same, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range (e.g., 1-20 is inclusive of 4.5, 5, 7.1 19.89).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those active ingredients according to the compositions of the present invention expressed as a percentage minus inert ingredients such as water or salts.

The term "adhesive" refers to a sticky, adherent, tacky, substance that causes something to adhere and/or makes a surface tacky and sticky.

As used herein, the term "substantially free" refers to compositions completely lacking the component or having such a small amount of the component that the component does not affect the performance of the composition. The component may be present as an impurity or as a contaminant and shall be less than 0.5 wt. %. In another embodiment, the amount of the component is less than 0.1 wt. % and in yet another embodiment, the amount of component is less than 0.01 wt. %.

The term "weight percent," "wt. %," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

As used herein, the term "wintergreen oil" (Oil of *Gaultheria procumbens*) denotes both extracted (by distillation of the leaves of *Gaultheria fragrantissima* Wall) and synthetic versions (e.g., methyl salicylate) and derivatives thereof, including, without limitation, O-hydroxybenzoic acid methyl ester; Betula oil; salicylic acid, methyl ester; benzoic acid, 2-hydroxy-, methyl ester (2-HOC$_6$H$_4$COOCH$_3$) (CAS Nos. 119-36-8 and 68917-75-9); sweet birch oil; *Gaultheria* oil; methyl hydroxybenzoate; O-hydroxybenzoate; 2-(methoxycarbonyl)phenol; 2-carbomethoxyphenol; Linsal; methylester kyseliny salicylove (Czech); o-anisic acid; panalgesic; methyl o-hydroxybenzoate; teaberry oil; analgit; exagien; flucarmit; anthrapole nd; Metsal liniment, and the like.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods, systems, apparatuses, and compositions.

While an understanding of the mechanism is not necessary to practice the present invention and while the present invention is not limited to any particular mechanism of action, it is contemplated that, in some embodiments, the non-adhesive coating compositions comprise a terpene, a staying agent, and a cleaning carrier and can be applied to any rubber surface to provide improved traction. Without being limited by the rubber surface it should be understood that the rubber surface may be a mobile surface that a user manipulates and/or wears (e.g., a bat, shoe, glove, or grip on equipment) or an immobile surface that a user comes in contact with (e.g., a floor or mat).

Compositions

The present invention provides non-adhesive coating compositions and methods of use. In an aspect, the non-adhesive coating compositions for application to a surface in need of treatment comprise, consist of and/or consist essentially of a terpene, a staying agent, and a cleaning carrier. In another aspect, the non-adhesive coating compositions may further comprise, consist of and/or consist essentially of an essential oil and/or additional functional ingredients. The non-adhesive coating compositions are prepared in a use compositions.

Terpene

The non-adhesive coating compositions of the present invention can contain a terpene. In an aspect of the invention, the terpene acts to clean and condition the surface and pores of the rubber. While not wishing to be bound by the theory, it is believed that the terpene assists in penetrating the surface such that the non-adhesive coating composition is able to penetrate the surface. Further the terpene has a residual effect in coating and lightly lubricating the rubber surface, thereby keeping it supple.

Terpenes are derived from units of isoprene which has the formula $C_5H_8$. Thus, the basic molecular formula for a terpene is $R(C_5H_8)_n$ where R is any substituent group, including, but not limited to H, OH, or other organic functional groups, and where n is the number of isoprene units linked together. In an embodiment of the invention n is between 2 and 10, preferably between 2 and 8, more preferably between 2 and 4, with a most preferred embodiment having n equal to 2. The isoprene units can be linked together head to tail in a linear chain or they can be linked together to form rings. When rings are formed, the terpene is referred to as a cyclic terpene. In an embodiment of the invention preferred terpenes are selected from the group consisting of monoterpenes, cyclic terpenes, and combinations thereof. Exemplary monoterpenes included, but are not limited to, D-limonene, terpineol, geraniol, D-pulegone.

Traditionally terpenes have been difficult to formulate with other components as they do not mix well. Surprisingly, however, the claimed invention has been able to formulate the terpene with the other components of the non-adhesive coating compositions in stable microemulsions. This is an advantage of the non-adhesive coating compositions.

The non-adhesive coating compositions contain the terpene component in an amount between about 5 wt. % and about 75 wt. %, preferably between about 15 wt. % and about 60 wt. %, more preferably between about 30 wt. % and about 55 wt. %, most preferably between about 35 wt. % and about 45 wt. %. In a most preferred embodiment the amount of terpene in the non-adhesive coating compositions is about 40 wt. %.

Staying Agent

The non-adhesive coating compositions can contain a staying agent. The staying agent helps form the microemulsion. Suitable staying agents include, but are not limited to, Castor oil, Coconut oil, Colza oil, Rapeseed oil, Canola oil, Cottonseed oil, Hemp oil, Mustard oil, Palm oil, Peanut oil, Radish oil, Rice bran oil, Safflower oil, Soybean oil, Sunflower oil, Tigernut oil, Tung oil, Corn oil, Olive oil, Sesame oil, and combinations of the same. In a preferred embodiment the staying agent comprises castor oil.

The non-adhesive coating compositions can contain the staying agent in an amount sufficient to form a stable microemulsion. An effective amount of the staying agent can be between about 0.01 wt. % and about 50 wt. %, preferably between about 0.1 wt. % and about 35 wt. %, more preferably between about 0.5 wt. % and about 25 wt. %, most preferably between about 1 wt. % and about 15 wt. %.

Cleaning Carrier

The non-adhesive coating compositions can contain a cleaning carrier. The cleaning carrier acts as a carrier for the other components in the non-adhesive coating compositions and also beneficially provides cleaning properties. Preferred cleaning carriers include lower alkanols and witch-hazel (*Hamamelis*). These materials are colorless liquids with mild pleasant odors. The cleaning carriers of the non-adhesive coating compositions are compatible with the other components such that stable microemulsions are formed. Examples of such useful cleaning carriers include methanol, ethanol, propanol, isopropanol and butanol, isobutanol, benzyl alcohol, and others.

The non-adhesive coating compositions contain the cleaning carrier in an amount between about 20 wt. % and about 80 wt. %, preferably between about 30 wt. % and about 70 wt. %, more preferably between about 40 wt. % and about 60 wt. %, most preferably between about 45 wt. % and about 55 wt. %. In a most preferred embodiment the amount of cleaning carrier in the non-adhesive coating compositions is about 50 wt. %.

Essential Oil

The non-adhesive coating compositions of the present invention can contain an essential oil. When used in the non-adhesive coating compositions, essential oils can be chosen to provide a fragrance, cleaning, softening, anti-bacterial, dirt repellent, and/or water repellent properties. While not wishing to be bound to theory, it is believed that the essential oil activates the rubber by lightly softening, refreshing and moistening the rubber upon absorbing into the pores and settling on the surface of the rubber. This increases the vitality of the rubber.

Essential oils that can be included in the non-adhesive coating compositions of the present invention include, without limitation, members selected from the group consisting of α- or β-pinene; α-campholenic aldehyde; α-citronellol; α-iso-amyl-cinnamic (e.g., amyl cinnamic aldehyde); α-pinene oxide; α-cinnamic terpinene; α-terpineol (e.g., methods. 1-methyl-4-isopropyl-1-cyclohexen-8-ol); λ-terpinene; achillea; aldehyde C16 (pure); alpha-phellandrene; amyl cinnamic aldehyde; amyl salicylate; anethole; anise; aniseed; anisic aldehyde; basil; bay; benzyl acetate; benzyl alcohol; bergamot (e.g., *Monardia fistulosa, Monarda didyma, Citrus bergamia, Monarda punctata*); bitter orange peel; black pepper; borneol; calamus; camphor; cananga oil (e.g., java); cardamom; carnation (e.g., *dianthus caryophyllus*); carvacrol; carveol; cassia; castor; cedar (e.g., hinoki); cedarwood; chamomile; cineole; cinnamaldehyde; cinnamic alcohol; cinnamon; cis-pinane; citral (e.g., 3,7-dimethyl-2,6-octadienal); citronella; citronellal; citronellol dextro (e.g., 3-7-dimethyl-6-octen-1-ol); citronellol; citronellyl acetate; citronellyl nitrile; *citrus unshiu*; clary sage; clove (e.g., *eugenia caryophyllus*); clove bud; coriander; corn; cotton seed; d-dihydrocarvone; decyl aldehyde; diethyl phthalate; dihydroanethole; dihydrocarveol; dihydrolinalool; dihydromyrcene; dihydromyrcenol; dihydromyrcenyl acetate; dihydroterpineol; dimethyl salicylate; dimethyloctanal; dimethyloctanol; dimethyloctanyl acetate; diphenyl oxide; dipropylene glycol; estragole; ethyl vanillin (e.g., 3-ethoxy-4-hydrobenzaldehyde); eucalyptol (e.g., cineole); eucalyptus citriodora; eucalyptus globulus; eucalyptus; eugenol (e.g., 2-methoxy-4-allyl phenol); evening primrose; fenchol; fennel; Ferniol™; fish; florazon (e.g., 4-ethyl-α,α-dimethylbenzenepropanal); galaxolide; geraniol (e.g., 2-trans-3,7-dimethyl-2,6-octadien-8-ol); geraniol; geranium; geranyl acetate; geranyl nitrile; ginger; grapefruit; guaiacol; guaiacwood; gurjun balsam; heliotropin; herbanate (e.g., 3-(1-methyl-ethyl)bicyclo(2,2,1)hept-5-ene-2-carboxylic acid ethyl ester); hiba; hydroxycitronellal; i-carvone; i-methyl acetate; ionone; isobutyl quinoleine (e.g., 6-secondary butyl quinoline); isobornyl acetate; isobornyl methylether; isoeugenol; isolongifolene; jasmine; jojoba; juniper berry; lavender; lavandin; lemon grass; lemon; lime; limonene; linallol oxide; linallol; linalool; linalyl acetate; linseed; litsea cubeba; 1-methyl acetate; longifolene; mandarin; *mentha*; menthane hydroperoxide; menthol crystals; menthol laevo (e.g., 5-methyl-2-isopropyl cyclohexanol); menthol; menthone laevo (e.g., 4-isopropyl-1-methyl cyclohexan-3-one); methyl anthranilate; methyl cedryl ketone; methyl chavicol; methyl hexyl ether; methyl ionone; mineral; mint; musk ambrette; musk ketone; musk xylol; mustard (also known as allylisothio-cyanate); myrcene; nerol; neryl acetate; nonyl aldehyde; nutmeg (e.g., *myristica fragrans*); orange (e.g., *citrus aurantium* dulcis); orris (e.g., *iris florentina*) root; para-cymene; para-hydroxy phenyl butanone crystals (e.g., 4-(4-hydroxyphenyl)-2-butanone); passion palmarosa oil (e.g., *cymbopogon martini*); patchouli (e.g., *pogostemon cablin*); p-cymene; pennyroyal oil; pepper; peppermint (e.g., *mentha piperita*); perillaldehyde; petitgrain (e.g., *citrus aurantium* amara); phenyl ethyl alcohol; phenyl ethyl propionate; phenyl ethyl-2-methylbutyrate; pimento berry; pimento leaf; pinane hydroperoxide; pinanol; pine ester; pine needle; pine; pinene; piperonal; piperonyl acetate;

piperonyl alcohol; plinol; plinyl acetate; pseudo ionone; rhodinol; rhodinyl acetate; rosalin; rosemary (e.g., *rosmarinus officinalis*); ryu; sage; sandalwood (e.g., *santalum album*); sandenol; sassafras; sesame; soybean; spearmint; spice; spike lavender; spirantol; starflower; tangerine; tea seed; tea tree; terpenoid; terpineol; terpinolene; terpinyl acetate; tert-butylcyclohexyl acetate; tetrahydrolinalool; tetrahydrolinalyl acetate; tetrahydromyrcenol; thulasi; thyme; thymol; tomato; trans-2-hexenol; trans-anethole and metabolites thereof; turmeric; turpentine; vanillin (e.g., 4-hydroxy-3-methoxy benzaldehyde); vetiver; vitalizair; white cedar; white grapefruit; (wintergreen) and the like. Preferred essential oils comprise wintergreen, peppermint, lavender, and combinations of the same.

The non-adhesive coating compositions can optionally contain one or more essential oils in an amount between about 0 wt. % and about 80 wt. %, preferably between about 0.01 wt. % and about 70 wt. %, more preferably between about 0.1 wt. % and about 60 wt. %, most preferably between about 1 wt. % and about 50 wt. %. In a most preferred embodiment the amount of terpene in the non-adhesive coating compositions is about 40 wt. %.

Additional Functional Ingredients

The non-adhesive coating compositions can also include colorants and/or fragrances. Additional functional ingredients, when included, can be included any desired amount to achieve the function of the particular ingredient. Additional functional ingredients can be added in an amount between about 0 wt. % and 60 wt. %, preferably between about 0.001 wt. % and about 25 wt. %, more preferably between about 0.01 wt. % and about 20 wt. %, most preferably between about 0.1 wt. % and about 10 wt. %

Colorants include any natural and/or artificial colors used to alter the color of the non-adhesive coating compositions. Suitable colorants include dyes, pigments, and natural coloring agents. Examples of suitable colorants include, but are not limited to, FD&C and D&C colorants, such as FD&C Violet No. 2, D&C Green No. 6, D&C Green No. 5, D&C Violet No. 2, FD&C Yellow No. 6, FD&C Red No. 3; and natural colorants, such as beetroot red, canthaxanthin, chlorophyll, eosin, saffron, and carmine.

Fragrances include any perfume, odor eliminator, odor masking agent, and combinations of the same. In an aspect of the invention, fragrances are any substance that has an effect on a person's olfactory senses.

Embodiments

The non-adhesive coating compositions can be formulated in any amount and are prepared in a use composition. Exemplary ranges of the non-adhesive coating compositions according to the invention are shown in Table 1 in weight percentages of the use compositions. It is to be understood that the non-adhesive coating compositions are in a stable microemulsion. In an embodiment of the invention, the microemulsions of the non-adhesive coating compositions are stable for up to one week, in a more preferred embodiment for up to one month, in still a more preferred embodiment for up to six months.

TABLE 1

| Material | First Exemplary Range wt. % | Second Exemplary Range wt. % | Third Exemplary Range wt. % | Fourth Exemplary Range wt. % |
| --- | --- | --- | --- | --- |
| Terpene | 5-75 | 15-60 | 30-55 | 35-45 |
| Cleaning Carrier | 20-80 | 30-70 | 40-60 | 45-55 |

TABLE 1-continued

| Material | First Exemplary Range wt. % | Second Exemplary Range wt. % | Third Exemplary Range wt. % | Fourth Exemplary Range wt. % |
| --- | --- | --- | --- | --- |
| Staying Agent | 0.01-50 | 0.1-35 | 0.5-25 | 1-15 |
| Essential Oil | 0-80 | 0.01-70 | 0.1-60 | 1-50 |
| Additional Functional Ingredients | 0-60 | 0.001-25 | 0.01-20 | 0.1-10 |

It is to be understood that all ranges recited are intended to be inclusive of the numbers defining the range and all numbers within the defined range.

In preferred embodiments of the invention the compositions are provided in 4.5 ounce formulations. However, it is understood that the compositions can be prepared in any size and provided in any size.

Methods of Use

The non-adhesive coating compositions are useful for cleaning, conditioning and highly enhancing the grip and traction of rubber, including, for example, the rubber soles of shoes. The non-adhesive coating compositions can be applied to a rubber surface by gently rubbing, misting, spraying, and/or rolling the compound onto the rubber surface and allowing the non-adhesive coating compositions to absorb into the rubber and dry on the surface.

The non-adhesive coating compositions can be used to coat rubber surfaces. The non-adhesive coating compositions are not to be limited by a particular rubber surface but can be used on any rubber surface. Examples of rubber surfaces include, but are not limited to, rubber soles of shoes, rubber gloves, rubber floors, rubber mats, rubber athletic courts, rubber handle grips, rubber treads, and/or rubber grips on athletic equipment such as racquets, bats, clubs, and balls. An advantage of the non-adhesive coating compositions is that the composition does not attract micro-debris and dirt, but rather repels it. This leaves the rubber surface contact areas clean, hydrophobic, and capable of providing traction.

In an embodiment of the non-adhesive coating compositions applied to rubber soled shoes, the rubber to athletic court traction is significantly increased. The friction is also increased and has the ability to maintain a very high friction for a time period sufficient to be effective for an entire sports contest. For example, the non-adhesive coating compositions have been found to be highly efficacious for use during three full-length basketball games over the course of a three day period without the need for retreatment. In a preferred embodiment, a court is treated prior to each individual game and/or daily. Thus, during this time period no reapplication is necessary.

The non-adhesive coating composition can be applied either as a quick-treatment or deep-treatment. The deep-treatment generally provides a superior longer lasting traction and grip enhancement. It is to be understood that these treatment methods can be applied to any rubber surface and are not limited to the soles of shoes.

For a deep treatment it is preferred that the rubber surface is first cleaned with a mild soap and water. However, the rubber surface can also be cleaned with just water and gentle rubbing. The non-adhesive coating composition can be applied to the rubber surface via applicator pad, roller or spray mist. If a mist is used it is preferred that the rubber surface be gently wiped to rub the non-adhesive coating composition into any crevices on the rubber surface. The non-adhesive coating composition should be allowed to absorb into the rubber and also dry on the rubber surface. One hour is the approximate dry time, although the time necessary will be effected by other factors, including, for example, temperature, humidity, and surface area, and type of rubber. In a preferred aspect the temperature is greater than about 60° F. during the drying time. If the rubber surface is a shoe, it is preferred that the shoes soles are left facing up.

The rubber surface traction can be increased for at least the time of an athletic event using the deep-treatment by about 10% or more, about 20% or more, or about 30% or more in comparison with a non-treated rubber surface. If a second deep-treatment is applied, the rubber surface traction may be further increased about 5% or more, about 10% or more, or about 20% or more as an improvement from the first deep treatment. Each treatment thereafter can provide an additional percentage increase in the rubber surface traction up to about 80% in comparison with a non-treated rubber surface. In an aspect of the invention, three deep-treatments can provide an increase in rubber surface traction of about 60% or more, about 70% or more, or about 80% or more in comparison with the non-treated rubber surface. Still in a further aspect of the invention, one deep treatment can provide increased traction for at least twelve hours or one entire game without the need for reapplication, two deep treatments can provide increased traction for at least twenty-four hours or two consecutive games without the need for reapplication, and three deep treatments can provide increased traction for up to two days including multiple games and practices without the need for reapplication.

The non-adhesive coating composition can be applied as a quick-treatment method via applicator pad, roller or spray mist to a rubber mat, such as a fiber weaved rubber backed mat. Then the rubber surface to be treated (e.g., shoe sole) is wiped in a scrubbing action for approximately three seconds on the treated mat. This very simple action can clean, condition, and treat the rubber surface (e.g., shoe sole). The individual may repeat the simple and quick process at any time to keep a 50+% traction increase. This mat treatment method may be used in conjunction with the deep-treatment to clean or retreat at any time if desired.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

It was found that the percentage of traction improvement is directly related to a number of different variables, including, but not limited to the brand of shoe, type of shoe, age of shoe, condition of shoe, treatment application method used, temperature, product dry time, court cleanliness, court material, and court finish. In each of the examples below, participants were requested to rate the traction of the shoes they were testing. The participants used the following scale:

Traction Scale Used by Athletes

| | |
|---|---|
| 10 | Excellent |
| 9 | great |
| 8 | fine |
| 7 | good |
| 6 | above average |
| 5 | average |
| 4 | below average |
| 3 | poor |
| 2 | low |
| 1 | no traction |

The non-adhesive coating compositions used for the examples were applied in 4.5 oz. bottles via spray mist application. The compositions comprised about 80 ml of isopropanol, about 60 ml of D-Limonene, 3 ml of essential oil comprising wintergreen oil peppermint oil, and/or lavender, and about 3 ml castor oil.

Example 1

Traction Study

The non-adhesive coating compositions of the present invention were tested for friction improvement. All shoes tested were cleaned thoroughly with a medium bristle brush using a mild soap and rinsed with water and allowed to air dry overnight before testing. Data was gathered by testing the friction resistance at four test levels: The first test is a cleaned untreated sole base test. This test sets the base calibration percentage for the mechanical testing. The second test was limited to shoe soles with one deep treatment of the non-adhesive coating composition. The third test was limited to shoe soles with two deep treatments of the non-adhesive coating composition. The forth test was limited to shoe soles with three deep treatments of the non-adhesive coating composition.

Kick Plate Test

This test was a kick plate friction response scaled mechanism. The kick plate method tested different brands and sizes of basketball shoes that were attached to a spring loaded swinging arm mechanism. The mechanism was extended back applying 160 pounds of spring force on the swinging arm. Once the mechanism was tripped the arm would swing quickly and the sole of the shoe strikes a flat hardwood flooring material that was on rollers. The flooring material moves forward and triggers a scaled measurable response. A multitude of random shoes from each of the pilot teams and controlled test shoes were used to gather the data listed below. Each shoe was tested repeatedly to gather consistent data. The data is provided below in Table 2.

TABLE 2

| Treatment | Avg. Percent[‡] Improvement | Avg. Total Percent[‡] Improvement from Base Measurement |
|---|---|---|
| After First Treatment | 34% | 34% |
| After Second Treatment | 24% | 58% |
| After Third Treatment | 21% | 79% |

[‡]Percent measurements are within ±3%.

Friction Slide Test

A second test was used to measure the friction through a slide mechanism. The shoes tested all received one deep treatment prior their first testing. The same shoes received a second deep treatment for the second friction measurement. The same shoes received a third deep treatment for the third friction measurement. The athletic shoes were fitted and weighted with 20 pounds of weight. The shoes were placed on a court surface that was rated as "good condition" by the test rubric. The gym floor rubric ratings of poor, average and good were developed through a series of friction floor tests. The testing tool used a dry friction method that measures the resistance of the lateral motion of two solid surfaces in contact. The contact surface of the measurement tool was cleaned with an alcohol wipe before each friction test. Five preset determined location points were tested on each gym floor. Each gym floor friction data points of origin were then averaged together thus generating the gym floor rating. The measurement tool measures the relative friction in Newton units. The data is provided in Table 3. Any averaged measurement between 9.90N and 11.12N was rated as below average. Any averaged measurement between 13.35N and 15.57N was rated as good on the rubric.

TABLE 3

| Rating | Mass (lbs) | Newtons (N) |
|---|---|---|
| Poor | 1.5 | 6.67 |
| Poor | 2.0 | 8.90 |
| Average | 2.5 | 11.12 |
| Average | 3.0 | 13.35 |
| Good | 3.5 | 15.57 |
| Good | 4.0 | 17.79 |

Each shoe was mechanically pulled forward and the friction was measured. The data listed is the result of the averaged percentages of each athletic shoe tested. The data is provided below in Table 4.

TABLE 4

| Treatment | Avg. Percent[‡] Improvement | Avg. Total Percent[‡] Improvement from Base Measurement |
|---|---|---|
| After First Treatment | 36% | 36% |
| After Second Treatment | 25% | 61% |
| After Third Treatment | 18% | 79% |

[‡]Percent measurements are within ±3%.

Example 2

Athletic Season Test

The non-adhesive coating compositions were tested for basketball, wrestling, and volleyball seasons. For the testing purposes athletic shoes for each sport were obtained in new condition to two years of age. The gym floor conditions were rated from average to good using a rubric established by the data determined by a newton measurement friction tool. The wrestling mats used in all testing locations were all rated in good condition through a hand check and visual inspection. This evaluation included age, cleanliness, material, and quality of the mats. Five pilot teams were established (three basketball, one volleyball, and one wrestling team). The teams were identified as follows:

A. Varsity Male Basketball Team
    B. Varsity Female Basketball Team
    C. Junior Varsity Male Basketball Team
    D. Varsity Wrestling Team
    E. Varsity Female Volleyball Team The teams tested the non-adhesive coating composition for an entire season including during practices. Each of the pilot test teams were competitive high school teams that competed at regional, sectional, and/or state competitions.

The basketball test data was developed through months of extensive testing at three levels for each team's entire basketball season. Basketball test groups included males and females ages 15 through 18. The groups A, B, C each included 15 participants per team. The data collected used information from twenty five games in each basketball group to develop the team, individual, and total collective data conclusions. The wrestling team individuals totaled 10 individuals ages 16 to 18. The wrestling schedule included 25 meets including practices. The volleyball team consisted of 14 participants ages 16 to 18. The volleyball participants competed and tested in a 24 game schedule including practices.

The season long duration allowed for months of testing, testing at 124 games/competitions, and many practices, the data represents a true sampling of the participant athletes. All players rated their shoes' traction from their previous treatment on the 1 to 10 scale prior to their shoes being treated with the next non-adhesive coating for the next athletic contest. In total sixty athletes were surveyed about twenty-five times each over the course of the season. The final averaged ratings for all of the five teams equaled 9.42 points on a 10 point scale.

Example 3

Comparative Test

The non-adhesive coating compositions of the present invention were tested and compared with a commercially available adhesive grip product, which is a liquid acetone-based adhesive product. It is applied to the soles of shoes via a bottle dauber wipe/pad applicator. The acetone dries quickly leaving a sticky adhesive residue on the shoe's sole. Both the non-adhesive coating compositions and the commercially available adhesive grip product were applied to the soles of athletic shoes. The instructions were accurately followed for applying the commercially available adhesive grip product in the following tests.

Basketball-type athletic shoes were used for the comparative tests. They were brand new to two years of age. The comparative tests were performed in a gymnasium on a gymnasium floor ("gym floor"). The gym floor conditions were rated in a good condition using a rubric determined by data determined by a newton measurement friction tool. Forty-five people participated in the study. They were males and females between the ages of 17 and 34. All shoes were cleaned with mild soap and rinsed with water. After washing and rinsing the shoes were dried overnight. The forty five participants were split into three groups of fifteen—Groups A, B, and C. Three shoe treatments were tested and compared:

Commercially Available Adhesive Product: Shoes were treated with the commercially available adhesive grip product following the manufacturer's instructions on the product.

Placebo: Shoe soles were misted with tap water and allowed to air dry.

Non-Adhesive Coating Composition: The non-adhesive coating composition was wiped onto the shoe soles and allowed to air dry.

In each group, five participant's shoes were treated with the commercially available adhesive product, five participant's shoes were treated with the placebo, and five participant's shoes were treated with the non-adhesive coating composition. Various tests were conducted and the participants were asked to provide responses rating the traction of the shoes. Four hundred and five responses were collected in this comparative study and analyzed.

Line Drill

Test groups A, B, and C each completed two skill drill warm-up activities and then participated in a fifteen minute scrimmage game. During these three drills, no further treatment was applied to the soles of the shoes.

Pre-set lines were taped off twenty feet apart. Five random participants in each subgroup (A, B, and C) were tested in three individual separate supervised test stations. Each group competed for 30 seconds traveling back and forth as quickly as possible between the lines. Each of the three different team's conclusion data in their respective sub groups tallied very consistent to the other (A, B and C) group's conclusions. All forty five participants rated their experience on a 10 point scale. Ten points ranked as high friction whereas one point ranked as minimal friction. The data was then averaged. Within all three groups, the first set of line drill conclusions was comparable. The placebo group average rating was 8.0 points. The average rating for the commercially available adhesive product was 8.5 points. The non-adhesive coating composition was rated with highest with an average rating of 9.5 points.

The same procedure was followed for a second set of line drills. Again, all forty five participants rated their experience on a 10 point scale. Ten points ranked as high friction whereas one point ranked as minimal friction. The data was then averaged. The second set of line drills showed significant slippage towards the end of the line drill activity with the commercially available adhesive product and received an average rating of 5.5 points. The placebo received an average rating of 7.5 points. The non-adhesive coating composition was again rated the highest with an average rating of 9.5 points; there were no negative responses regarding the non-adhesive coating compositions.

The same procedure was followed for a third set of line drills. Again, all forty five participants rated their experience on a 10 point scale and the data was averaged. Ten points ranked as high friction whereas one point ranked as minimal friction. Again, the third set of line drills showed significant increase in slippage with commercially available adhesive product, which received an average rating of 3.0 points. The participants whose shoes were coated with the commercially available adhesive product complained of slippage. The placebo received an average rating of 6.5 points. The non-adhesive coating composition again received a consistently highest rating, far exceeding the ratings of the commercially available adhesive product and the placebo. The average rating for the non-adhesive coating composition was 9.0 points. The ratings for these three line drill experiments are summarized in Table 5.

TABLE 5

| Shoe Treatment | First Line Drill | Second Line Drill | Third Line Drill |
| --- | --- | --- | --- |
| Commercially Available Adhesive Product | 8.5 | 5.5 | 3.0 |
| Placebo | 8.0 | 7.5 | 6.5 |
| Non-Adhesive Coating Composition | 9.5 | 9.5 | 9.0 |

It is clear from these results that the non-adhesive coating composition not only provided better traction upon the initial use of the shoes following treatment, but it also maintained substantially higher ratings than the commercially available adhesive rating and placebo treatment.

Cone Drill

Immediately following the line drill testing, participants were directed to run in a thirty foot long figure eight path. Each person attempted to complete four laps as fast as safely possible. Each participant completed 2 cone drill sets. No participant's shoes were cleaned or altered for this test.

Three test stations were used at the same time with supervisors. Participants were tested in a random order within their respective groups. Each of the forty five participants attempted two sets. All forty five participants rated their experience on a 10 point scale. Ten points ranked as high friction whereas one point ranked as minimal friction. The data was then averaged.

All participants rated their own traction before participating in the cone drill. The placebo received a pre-test average rating of 7.0 points. The commercially available adhesive product received a pre-test average rating of 3.0 points. The non-adhesive coating composition received a pre-test average rating of 9.0 points. After completing the first cone set of four laps the participants were asked to rate their traction. The placebo received a rating of 5.5 points. The commercially available adhesive product received a rating of 2.5. The non-adhesive coating composition received a rating of 8.5. After completing the second cone set of four laps the participants were again asked to rate their traction. The placebo received a rating of 5.0 points. The commercially available adhesive product received a rating of 2.0. The non-adhesive coating composition received a rating of 8.5. The ratings for the cone test are summarized in Table 6.

TABLE 6

| Shoe Treatment | Pre-Test | First Cone Test | Second Cone Test |
| --- | --- | --- | --- |
| Commercially Available Adhesive Product | 3.0 | 2.5 | 2.0 |
| Placebo | 7.0 | 5.5 | 5.0 |
| Non-Adhesive Coating Composition | 9.0 | 8.5 | 8.5 |

It is clear from these results that the non-adhesive coating composition continued to provide consistently higher traction than the commercially available adhesive rating and placebo treatment and degraded much slower.

The line drill and cone tests provided consistent results in the comparison of the commercially available adhesive product and the non-adhesive coating composition. The total time duration for the completion of both sets of line drills and the cone drill using three test stations simultaneously totaled twelve minutes and thirty five seconds.

Scrimmage Drills

Following completion of the cone drills, the shoes treated with the commercially available adhesive product were again treated with the commercially available adhesive product according to the manufacturer's instructions. The soles of the placebo-treated shoes were again misted with water and lightly wiped to dry. The shoes previously treated with the non-adhesive coating compositions remained the same and were not treated again.

Groups A, B and C were each divided into two subgroups. Seven and eight player divisions were used for team divisions. Each subgroup scrimmaged within its own group (i.e., Groups A, B, and C) for a fifteen minute duration. The participants rotated at three minute intervals. A half-court game scenario was used for play. All participant data was generated pre-scrimmage and post-scrimmage. All forty five participants rated their traction on a 10 point scale. Ten points ranked as high friction whereas one point ranked as minimal friction. The data was then averaged. The results are contained in Table 7.

TABLE 7

| Shoe Treatment | Pre-Scrimmage | Post-Scrimmage |
| --- | --- | --- |
| Commercially Available Adhesive Product | 9.5 | 3.0 |
| Placebo | 8.5 | 6.5 |
| Non-Adhesive Coating Composition | 9.0 | 9.0 |

All of the participants whose shoes were treated with the commercially available adhesive product reported slippage in the first five minutes of scrimmage play. During the scrimmage play nine of the fifteen participants whose shoes were treated with the commercially available adhesive product felt it was necessary to reapply the product for safety purposes. For the six participants using the commercially available adhesive product that did not reapply the product, very little traction was evident at the completion of the fifteen minutes. No player exceeded twelve minutes of total court time. Of the participants whose shoes were treated with the placebo, limited complaints were noted. No complaints were noted and the average ratings were reported as consistent (9.0) for the participants whose shoes were originally treated with the non-adhesive coating compositions.

It was found that the commercially available adhesive product only worked temporarily and did not fare well in court conditions that were not exceptionally clean. The stickiness of the commercially available adhesive product caused the shoe soles to collect particulate, dust, and other micro-debris from the floor. This greatly reduced the traction of the shoes, such that it was more preferable to use shoes without any treatment. After a short amount of time the adhesive product require reapplication in order to dissolve the old glue, dirt, and debris that becomes stuck and collected on the bottom of the shoe sole. Additionally it was found that the adhesive type product removes dyes from the sides of shoes and leaves glue marks on the surface which the shoes are used on. It is believed that these problems are due to the harsh chemicals required in the adhesive type products and due to the glue-like stickiness of the coating.

In comparison it was found that the non-adhesive coating compositions provide a cleaning and conditioning effect on the rubber surface. Further the non-adhesive coating compositions were found to provide better traction for longer periods of time without requiring reapplication to maintain effective traction. The non-adhesive coating compositions do not stain, do not contain harsh chemicals that remove color from the shoes, and do not leave a residue or markup on a surface that the rubber surface comes in contact with. Further, certain embodiments of the non-adhesive coating compositions have a pleasant odor, which can be due to essential oils used in some formulations and/or due to fragrances added to the formulation.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A non-adhesive composition for enhancing traction of rubber surfaces comprising:
   a terpene and/or essential oil;
   a staying agent comprising one or more of castor oil, coconut oil, colza oil, rapeseed oil, canola oil, cottonseed oil, hemp oil, mustard oil, palm oil, peanut oil, radish oil, rice bran oil, safflower oil, soybean oil, sunflower oil, tigernut oil, tung oil, corn oil, olive oil, and sesame oil; and
   a cleaning carrier comprising one or more of a lower alkanol and witch-hazel (*Hamamelis*);
   wherein the traction-enhancing composition is in a stable microemulsion containing less than about 0.5 wt. % adhesives.

2. The composition of claim 1 comprising both a terpene and an essential
   oil, wherein the terpene is between about 5 wt. % and about 75 wt. % of the composition, wherein the at least one essential oil is between about 0.1 wt. % and 80 wt. % of the composition, wherein the staying agent is between about 0.01 wt. % and about 50 wt. % of the composition, and wherein the cleaning carrier is between about 20 wt. % and about 80 wt. % of the composition.

3. The composition of claim 1 further comprising at least one additional functional ingredient.

4. The composition of claim 1 comprising a terpene, wherein the terpene is between about 5 wt. % and about 75 wt. % of the composition, the staying agent is between about 0.01 wt. % and about 50 wt. % of the composition, and the cleaning carrier is between about 20 wt. % and about 80 wt. % of the composition.

5. The composition of claim 2 wherein the terpene is between about 15 wt. % and about 60 wt. % of the composition, wherein the at least one essential oil is between about 0.01 wt. % and 70 wt. % of the composition, the staying agent is between about 0.1 wt. % and about 35 wt. % of the composition, and the cleaning carrier is between about 30 wt. % and about 70 wt. % of the composition.

6. A surface with improved traction comprising:
   a rubber surface coated with a composition comprising a terpene and/or an essential oil, a staying agent comprising one or more of castor oil, coconut oil, colza oil, rapeseed oil, canola oil, cottonseed oil, hemp oil, mustard oil, palm oil, peanut oil, radish oil, rice bran oil, safflower oil, soybean oil, sunflower oil, tigernut oil, tung oil, corn oil, olive oil, and sesame oil, and a cleaning carrier comprising one or more of a lower alkanol and witch-hazel (*Hamamelis*);

wherein the composition applied to the rubber surface is in a stable microemulsion substantially free of adhesives, wherein the surface has an improved traction of at least about 20% in comparison with the surface when it is not coated with the composition.

7. The surface of claim 6 wherein the composition further comprises at least one of the following: a colorant or a fragrance.

8. The surface of claim 6 wherein the surface is selected from the group consisting of a shoe sole, a floor, a glove, a handle, or a grip.

9. The surface of claim 6 comprising both a terpene and an essential oil, wherein the terpene is between about 5 wt. % and about 75 wt. % of the composition, the essential oil is between about 0.1 wt. % and about 80 wt. %, the staying agent is between about 0.01 wt. % and about 50 wt. % of the composition, and the cleaning carrier is between about 20 wt. % and about 80 wt. % of the composition.

10. The surface of claim 6 comprising both a terpene and an essential oil, wherein the terpene is between about 15 wt. % and about 60 wt. % of the composition, the essential oil is between about 0.01 wt. % and about 70 wt. %, the staying agent is between about 0.1 wt. % and about 35 wt. % of the composition, and the cleaning carrier is between about 30 wt. % and about 70 wt. % of the composition; and wherein the composition contains less than about 0.5 wt. % adhesives.

11. The surface of claim 6, wherein the surface has an improved traction of at least about 40% in comparison with the surface when it is not coated with the composition.

12. A method of enhancing the traction of a surface comprising:

applying a rubber surface with a composition comprising a terpene and/or an essential oil, a staying agent comprising one or more of castor oil, coconut oil, colza oil, rapeseed oil, canola oil, cottonseed oil, hemp oil, mustard oil, palm oil, peanut oil, radish oil, rice bran oil, safflower oil, soybean oil, sunflower oil, tigernut oil, tung oil, corn oil, olive oil, and sesame oil, and a cleaning carrier comprising one or more of a lower alkanol and witch-hazel (*Hamamelis*); wherein the composition is in a stable microemulsion and contains less than about 0.5 wt. % adhesives;

drying the composition on the rubber surface;

increasing traction of the rubber surface by at least about 20% in comparison with the rubber surface when it is not coated with the composition.

13. The method of claim 12 wherein the applying step is performed by rubbing, rolling, and/or misting the composition onto the surface.

14. The method of claim 12 wherein the surface is selected from the group consisting of a shoe sole, a floor, a glove, a handle, or a grip.

15. The method of claim 12 comprising both a terpene and an essential oil, wherein the terpene is between about 5 wt. % and about 75 wt. % of the composition, the essential oil is between about 0 wt. % and about 80 wt. %, the staying agent is between about 0.01 wt. % and about 50 wt. % of the composition, and the cleaning carrier is between about 20 wt. % and about 80 wt. % of the composition.

16. The method of claim 15 wherein the composition further comprises at least one of the following: a colorant or a fragrance.

17. The method of claim 12, wherein the traction is increased by at least about 40% in comparison with the rubber surface when it is not coated with the composition.

18. The composition of claim 1, wherein the staying agent is castor oil.

19. The composition of claim 1, wherein the cleaning carrier is a lower alkanol of isopropanol.

20. The surface of claim 6, wherein the staying agent is castor oil and the cleaning carrier is a lower alkanol of isopropanol.

* * * * *